United States Patent [19]

Fehrenbach et al.

[11] Patent Number: 4,671,145

[45] Date of Patent: Jun. 9, 1987

[54] METHOD AND APPARATUS FOR THE SURFACE MACHINING OF SUBSTRATE PLATES FOR MAGNETIC MEMORY PLATES

[75] Inventors: Hubert Fehrenbach, Kehl; Volker Koch, Battenberg; Bernhard Boese, Kehl, all of Fed. Rep. of Germany

[73] Assignee: BASF Aktiengesellschaft, Ludwigshafen, Fed. Rep. of Germany

[21] Appl. No.: 745,951

[22] Filed: Jun. 18, 1985

[51] Int. Cl.⁴ ............................ B23B 1/00; B23B 5/40
[52] U.S. Cl. ........................................ 82/1 C; 51/235; 51/324; 82/11; 82/24 R; 82/40 R; 279/3; 408/19
[58] Field of Search ............... 82/2 R, 1 C, 11, 24 R, 82/40 R; 279/3; 408/19; 409/219; 51/235, 324

[56] References Cited

U.S. PATENT DOCUMENTS

| | | | |
|---|---|---|---|
| 3,434,375 | 3/1969 | Clashausen | 82/24 R |
| 3,677,115 | 7/1972 | Skrentner | 82/24 R |
| 3,693,301 | 9/1972 | Lemaitre | 51/235 |
| 3,889,431 | 6/1975 | Johnson | 51/324 |
| 4,343,206 | 8/1982 | Douglass et al. | 82/2 R |
| 4,391,511 | 7/1983 | Akiyama et al. | 279/3 |
| 4,506,184 | 3/1985 | Sidall | 279/3 |
| 4,553,457 | 11/1985 | Eitel | 82/1 C |

FOREIGN PATENT DOCUMENTS

| | | | |
|---|---|---|---|
| 161180 | 12/1979 | Japan | 408/19 |
| 662962 | 8/1979 | U.S.S.R. | 51/235 |

*Primary Examiner*—Nicholas P. Godici
*Assistant Examiner*—Jerry Kearns
*Attorney, Agent, or Firm*—Keil & Weinkauf

[57] ABSTRACT

Before being coated with the magnetizable material, the substrate plates are machined on a precision turning lathe in such a way that the annular surface provided for the storage area is convexly arched on both sides of the plate. For this purpose, the substrate plate, during machining, is held on the chuck in a concave arch of the annular surface and machined flat with a purely radial free movement of the cutting tool, or held on a flat chuck and turned down under a feed movement of the tool, which feed movement corresponds to the required convex arching of the annular surface. In the first machining method, the elastically deformed substrate plate, after removal from the chuck, loses tension and forms a convexly arched annular surface.

4 Claims, 4 Drawing Figures

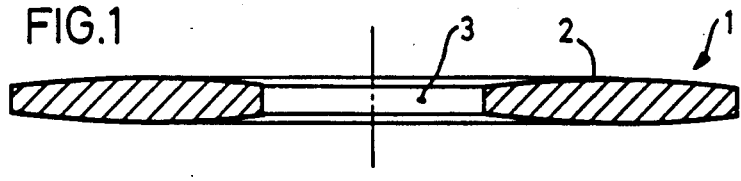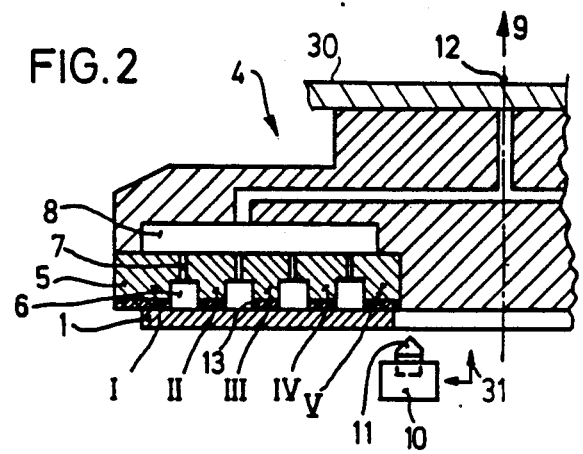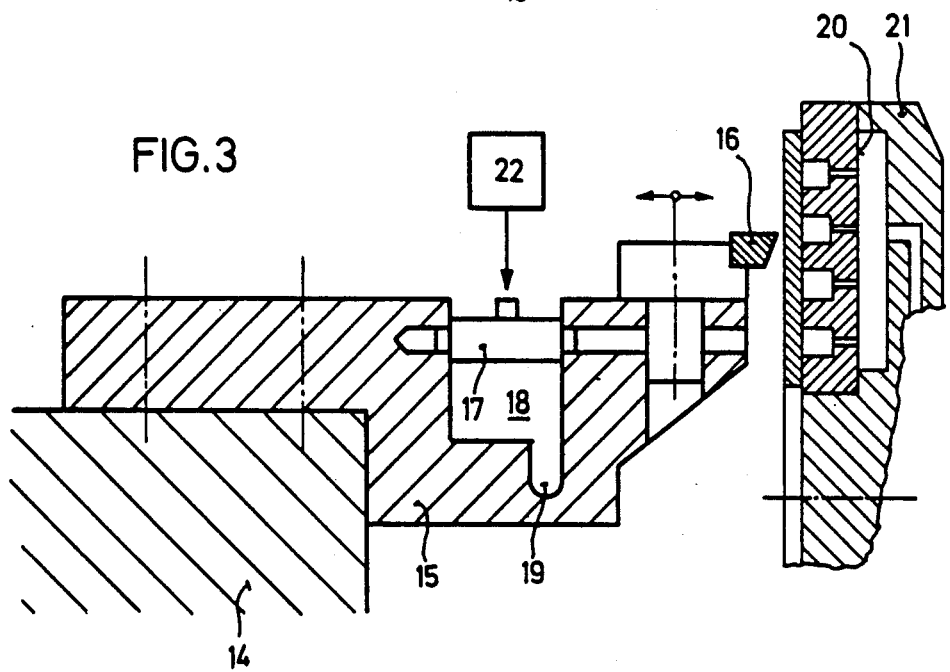

METHOD AND APPARATUS FOR THE SURFACE MACHINING OF SUBSTRATE PLATES FOR MAGNETIC MEMORY PLATES

The present invention relates to a method and apparatus for machining the surfaces of substrate plates for magnetic memory plates, in which the cutting tool is guided over the rotating plate in a feed movement corresponding to the required surface form. Furthermore, the present invention relates to an apparatus for implementing the method, having a drivable chuck which is equipped with a front disk, having concentrically arranged annular grooves connected to a vacuum source, for clamping the substrate plate to be machined, and having a tool slide for the cutting tool, which tool slide can be moved both along the chuck axis and perpendicularly thereto.

Extremely high demands are made on the flatness and surface quality of magnetic memory plates in which the magnetic heads, during the rotation of the plate, are located in an overhung position at a distance of less than 1 um above the surface for the write/read operation. These properties, on which the floating characteristics of the magnetic heads depend, are essentially determined by the base of the magnetic film, the substrate plates. Troublefree write/read operation is only guaranteed when the flight of the magnetic head is undisturbed.

The substrate plates provided for such magnetic memory plates are faced by a diamond tool after preliminary machining on a high-precision turning lathe. During this operation, they are clamped on a front disk of the chuck by means of a vacuum. After the plates are removed from the front disk, they often assume, as a result of internal stresses, a slightly dished shape in the order of magnitude which is critical for the floating characteristics of the magnetic heads. Measurements have shown that the excessive increase in height or deepening of the recording area relative to the plate edge caused by this is about 2 to 5 um relative to the plate edge at a plate diameter of from 100 to 150 mm.

We have found that the electromagnetic properties, especially the scanning level, on the convexly curved side of such a plate are better than on the concavely curved side. We have also found that the signal level is higher than on plates which are completely flat on both sides.

It is an object of the present invention to provide a method and an apparatus for machining the surfaces of substrate plates for magnetic memory plates, by means of which the electro-magnetic values are equally good on both sides of the plate and a concave curvature on one side is avoided.

This object is achieved by a machining method in which the cutting tool is guided over the rotating plate in a feed movement corresponding to the required surface form, in which method a convexly arched annular surface, which is provided for the storage area, is made on both sides of the plate by a tool feed movement which is adapted to an adjustable clamping profile of the substrate plate to be machined.

In one embodiment of the method, the substrate plate, when being clamped, is elastically deformed into a concave arching of the annular surface to be machined and the cutting tool is radially guided over the surface. When the plate is subsequently clamped the other way around for machining the reverse annular surface, the latter is arched twice as much.

In a further embodiment of the method, the substrate plate is clamped flat and the cutting tool is guided over the annular surface to be machined in a curve describing a convex arch. For subsequent machining of the reverse annular surface, the tool is guided in an arch which is twice as great in order to compensate the deformation as a result of the arch clamped on the chuck.

In another embodiment of the method, the substrate plate is clamped flat, the cutting tool is guided radially over the surface, and the chuck executes an axial displacement movement adapted to the feed of the tool, so that a convex machining profile develops. For subsequent machining of the reverse annular surface, the chuck executes twice the axial stroke in order to compensate the deformation as a result of the arch clamped in the chuck.

An apparatus for machining the surfaces of substrate plates for magnetic memory plates is equipped with a drivable chuck which is equipped with a front disk, having concentrically arranged annular grooves connected to a vacuum source, for clamping the substrate plate to be machined, and having a tool slide for the cutting tool, which tool slide can be moved both along the chuck axis and perpendicularly thereto, the webs formed by the annular grooves being set back more and more by an order of magnitude in the micrometer range toward the center of the annular support surface for the substrate plate formed by the webs, so that the support surface is concavely arched.

A further machining apparatus is equipped with a drivable chuck which is equipped with a front disk, having concentrically arranged annular grooves connected to a vacuum source, for clamping the substrate plate to be machined, and having a tool slide for the cutting tool, which tool slide can be moved both along the chuck axis and perpendicularly thereto, the webs formed by the annular grooves being dimensioned with smaller widths toward the center of the annular support surface for the substrate plate formed by the webs, so that, as a result of the consequently decreasing support forces, a concavely arched deformation of the substrate plate appears.

Another machining apparatus is equipped with a drivable chuck which is equipped with a front disk, having concentrically arranged annular grooves connected to a vacuum source, for clamping the substrte plate to be machined, and having a tool slide for the cutting tool, which tool slide can be moved both along the chuck axis and perpendicularly thereto, the tool being connected to a regulating element which is effective along the chuck axis, the regulated quantity of which regulating element is controllable in the micrometer range.

A further machining apparatus is equipped with a drivable chuck which is equipped with a front disk, having concentrically arranged annular grooves connected to a vacuum source, for clamping the substrate plate to be machined, and having a tool slide for the cutting tool, which tool slide can be moved both along the chuck axis and perpendicularly thereto, the chuck being connected to a regulating element which is effective along the chuck axis, the regulated quantity of which regulating element is controllable in the micrometer range.

The invention is described in detail below with reference to the drawings, in which:

FIG. 1 shows a substrate plate machined according to the invention in diametral cross-section.

FIG. 2 shows a longitudinal section of the chuck, designed acording to the invention, of a precision turning lathe, with the clamped substrate plate and the turning tool.

FIG. 3 shows a longitudinal section of the holder for the turning tool, which holder is equipped with a regulating element.

Figure 4:
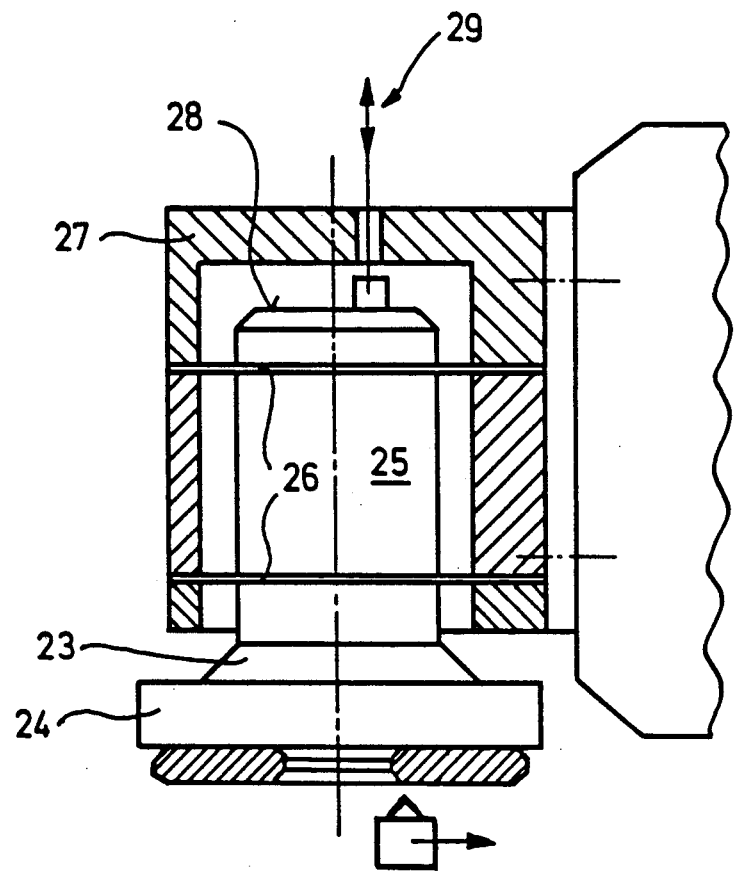
FIG. 4 shows a chuck which is connected to an axially effective regulating element.

By means of the surface machining according to the invention, a substrate plate 1 is to be made, the annular surface of which, provided for the storage area, has a central aperture 3 and, as can be seen in FIG. 1, is convexly arched on both sides of the plate.

For this purpose, a precision turning lathe suitable for the machining and schematically is equipped with a chuck 4 (FIG. 2) which has a front disk of aluminum. The front disk is provided with concentrically arranged annular grooves 6 which are connected with a vacuum source 9 by bores 7 and a collecting channel 8. A tool slide 10 with the cutting tool 11 is conventionally arranged in front of the chuck, and is therefore only indicated in the drawing, and is mounted to be movable both along the chuck axis 12 and perpendicularly thereto for the feed movement corresponding to the required surface form of the plate to be machined. The two directions of feed movement of the tool slide 10 as indicated in FIG. 2 by the two arrows 31 may be taken to schematically represent the support means for the tool slide which, in a manner not particularly shown in the drawing, are a part of lathe 30.

The webs 13 which are formed by the annular grooves 6 and which form an annular support surface for the substrate plate which is held by a vacuum in the grooves of about 400 mm/Hg are increasingly set back toward the center of the support surface; in the example according to FIG. 2, webs II and IV are set back by 2 μm and web 3 by 4 μm, so that the clamped substrate plate assumes a slightly concave clamping profile. In this position, the substrate plate is machined flat by a purely radial feed movement of the tool slide 10. By subsequently cutting off the vacuum in order to remove the elastically deformed plate from the front disk 5, the latter loses tension, so that the turned annular surface 2 arches convexly. The reverse annular surface is machined in the same manner, but on a second chuck in which, because of the arching of the bearing surface which is to be compensated, the webs of the front disk are set back twice as much as in the first front disk.

The concave clamping profile of the substrate plate clamped for the cutting operation can also be achieved in that the webs 13 formed by the annular grooves 6 are made of an elastic material and are not set back toward the center of the annular support surface formed by the webs, but decrease in their width; for example, the width of webs I and V is 5 mm, webs II and IV 4 mm and web III 3 mm. Because of the reducing material thickness, the webs are increasingly pressed together elastically toward the center of the support surface under the bearing force of the substrate plate clamped by vacuum, so that the plate is concavely deformed. Machining continues as described above, the different archings of the plate on the first and second machining sides being produced by different vacuums, for example 300 mm/Hg for the first side and 400 mm/Hg for the second side for an arch height of 4 μm.

In a further embodiment of the surface machining according to the invention, the convex arching of the annular surface 2 can also be obtained in that the substrate plate 1 is clamped on a flat front disk 20 of the chuck 21 and the cutting tool is guided over the rotating plate in a feed movement corresponding to the required arching. As can be seen in FIG. 3, the holder 15 of the tool 16, which holder is fixed on the tool slide 14, is provided with a regulating element 17 for the axial movement components necessary for this purpose, which regulating element 17 is inserted into a recess 18 which imparts a certain elastic mobility to a part of the holder carrying the tool. The mobility required for the particular application can be controlled by a depression 19 to be dimensioned accordingly. Especially suitable as the regulating element is a quartz crystal which is deformed when an electric voltage is applied, so that the length of the crystal can be changed in accordance with the desired feed movement exactly and reproducibly in the micrometer range by means of a voltage control 22. Of course, other regulating devices, for example electro-magnetic, pneumatic or hydraulic regulating members, can also be used provided they can be controlled within the said dimensional range.

This machining method makes it possible for both sides of a substrate plate to be machined on a chuck, because the arching which has to be twice as pronounced for the second machining side can be set by means of the voltage control 22. In this connection, a particular advantage is that the depth preparation of the webs is dispensed with and the bearing surface of the front disk can be completely flat.

A further way of making surfaces of the substrate plate which are convexly curved on both sides is that the substrate plate is clamped flat and the cutting tool is guided radially and in a straight line over the surface and the chuck executes an axial displacement movement which is adapted to the feed of the tool, so that a convex machining profile is obtained. Here, too, for the reasons described above, an axial stroke which is twice as great is required when machining the reverse annular surface.

For this purpose, an embodiment shown in figure 4 makes provision for the drive spindle 23 of the chuck 24 and the drive motor 25 to form a unit which is fixed to the machine frame 27 by means of two diaphragms 26. To displace the unit axially, the motor housing 28 is connected to a controllable regulating element 29, as described above for the axially displaceable tool. Apart from an electric (eg. piezoelectric) or pneumatic or hydraulic regulating element, an electromechanical regulating drive, for example a stepping motor, can also be used.

If an air-cushioned spindle is provided, it can be axially displaced by unidirectional variation of the air pressure in the bearing gap. Air-bearing spindles are available from specialist stockists, and thus an illustrative representation can be dispensed with. It is then merely necessary to provide suitable air control.

We claim:

1. A method of machining substrate plates for magnetic memory plates having an annular storage area, in such a way that convexly curved surfaces are formed on both sides of said substrate plate in said storage area, comprising (1) providing
   a chuck, driveable about an axis, and having a flat front disk with vacuum connected annular grooves, a cutting tool carried by a tool slide which is movable in a direction parallel to as well as perpendicular to the chuck axis, and a regulating element interposed between said slide and said tool for displacing said tool, in a direction parallel to the chuck axis, the amount of said displacement being controllable in the micrometer range, (2) causing the substrate plate to be held flat against said disk by said vacuum, (3) driving the chuck with the substrate plate thereon and machining the exposed surface of the substrate plate by means of said cutting tool and with the aid of said regulating element, to a convexly arched surface, (4) disconnecting the vacuum to release the substrate plate, (5) reversing the substrate plate and reconnecting the vacuum to cause the substrate plate again to be driven by said chuck in its reversed condition and with the arched surface thereof held flat against said disk so that the substrate plate is convexly deformed, (6) with the substrate plate in this condition machining the now exposed surface of the substrate plate by means of said cutting tool and with the aid of said regulating element to a convexly arched shape that is twice as pronounced as that imparted on the first-mentioned surface, and then, (7) again disconnecting the vacuum and thereby allowing the substrate plate to straighten out.

2. A method of machining substrate plates for magnetic memory plates having an annular storage area, in such a way that convexly curved surfaces are formed on both sides of said substrate plate in said storage area, comprising (1) providing
   a machine frame,
   a chuck, driveable about an axis, and having a flat front disk with vacuum connected annular grooves,
   a cutting tool carried by a tool slide which is movable in a direction parallel to as well as perpendicular to the chuck axis, and
   a regulating element interposed between said driveable chuck and said machine frame, for axially displacing said chuck by an amount controllable in the micrometer range, (2) causing the substrate plate to be held flat against said disk by said vacuum, (3) driving the chuck with the substrate plate thereon and machining the exposed surface of the substrate plate by means of said cutting tool and with the aid of said regulating element, to a convexly arched surface, (4) disconnecting the vacuum to release the substrate plate, (5) reversing the substrate plate and reconnecting the vacuum to cause the substrate plate again to be driven by said chuck in its reversed condition and with the arched surface thereof held flat against said disk so that the substrate plate is convexly deformed, (6) with the substrate plate in this condition machining the now exposed surface of the substrate plate by means of said cutting tool and with the aid of said regulating element to a convexly arched shape that is twice as pronounced as that imparted on the first-mentioned surface, and then, (7) again disconnecting the vacuum and thereby allowing the substrate plate to straighten out.

3. A method of machining, by means of a cutting tool, the surface of substrate plates for magnetic memory plates having an annular storage area, while the substrate plate is held by a driven chuck, said method comprising the steps of (1) causing the substrate plate, by elastic deformation, to be held by said chuck in a concavely arched shape, (2) driving said chuck with the thus deformed substrate plate thereon, and machining the exposed surface of the substrate plate, while so driven, with said cutting tool, and (3) releasing the tension on the substrate plate and hence allowing the substrate plate to straighten out, whereby said exposed surface of the substrate plate assumes a convex shape over said annular area, (4) reversing the substrate plate, (5) causing the reversed substrate plate to be held by said chuck through an elastic deformation twice as great as that of step 1, in a corresponding concavely-arched shape, thereby to compensate for the convex shape of the earlier machined surface, (6) driving said chuck with the thus deformed substrate plate thereon and machining the now exposed surface of the substrate plate, while so driven, with said cutting tool, and then (7) allowing the substrate plate again to straighten out, whereby the last-mentioned exposed surface of the substrate plate, also assumes a convex shape over said annular area.

4. An apparatus for the machining of substrate plates for magnetic memory plates having an annular storage area, comprising a chuck, means for driving said chuck about an axis, said chuck including a front disk having formed thereon between webs, concentric annular grooves which are connected to a vacuum source, for holding said annular area of the substrate plate to said disk, and a cutting tool carried by a tool slide, means for moving said tool slide in a direction parallel to as well as perpendicular to the chuck axis, said webs being made of an elastic material and having widths the amount of which decreases toward the center of said area so that when the substrate plate is urged against said front disk by said vacuum, the resulting, increasingly weaker support for said plate toward the center causes said plate to assume a concavely arched shape and to be machined by said tool in this condition, whereby the substrate plate after straightening out due to the loss of its tension upon release of the vacuum, exhibits a concavely arched front surface in said annular storage area.

* * * * *